Jan. 10, 1967 F. S. FLICK ETAL 3,296,877
LEVER ARM FOR VALVE OPERATOR
Original Filed March 6, 1963 2 Sheets-Sheet 1
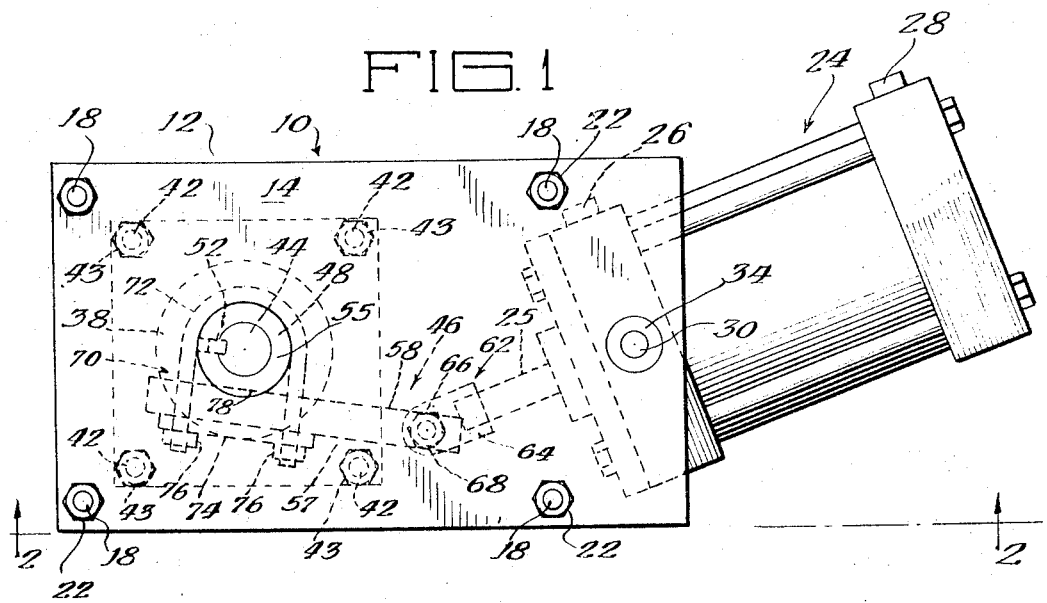
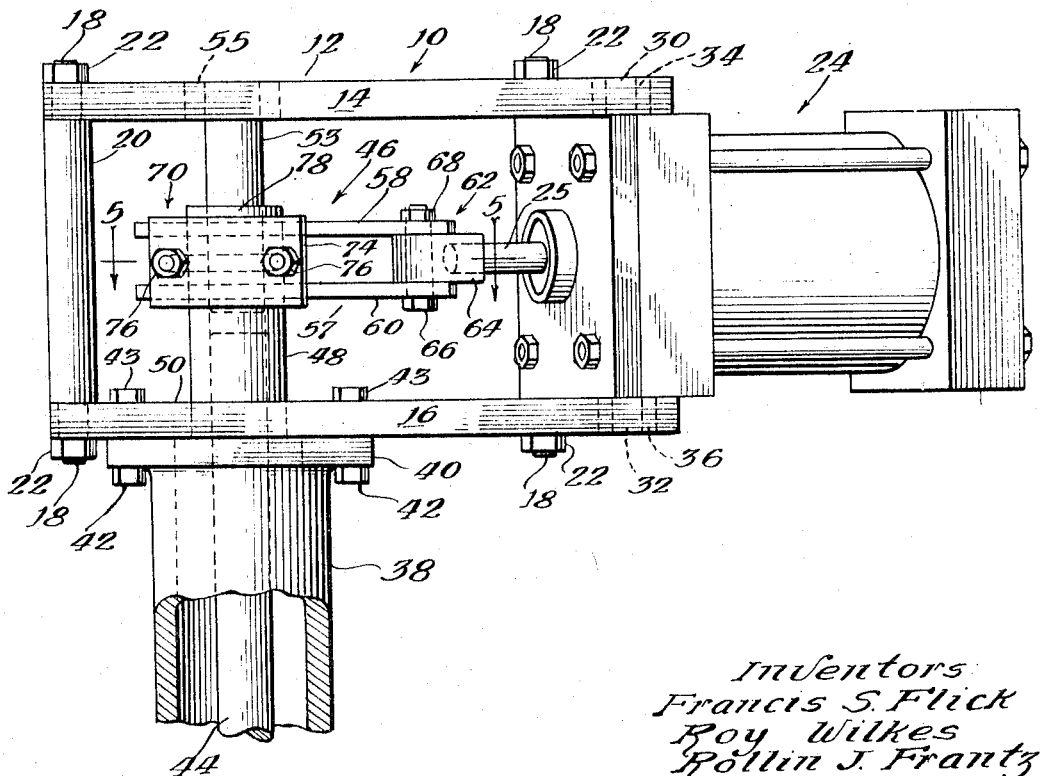
Inventors
Francis S. Flick
Roy Wilkes
Rollin J. Frantz
By: Hofgren, Wegner, Allen,
Stellman & McCord
Attorneys

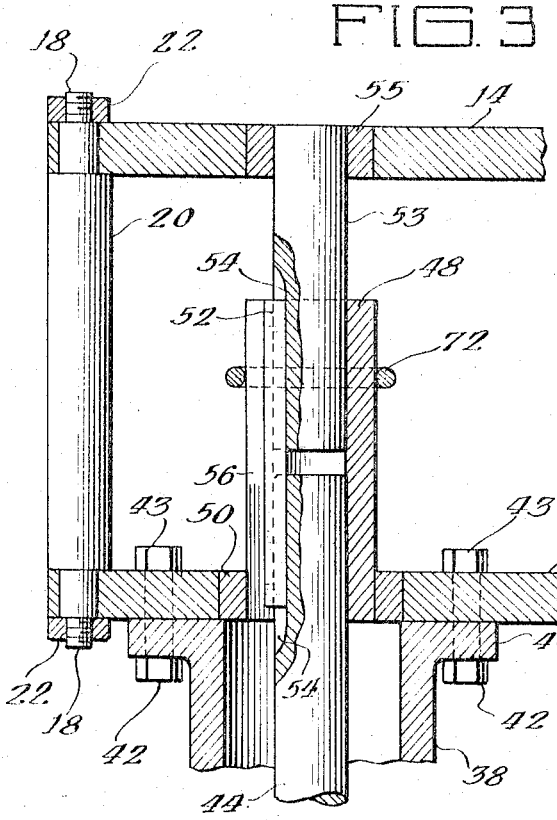
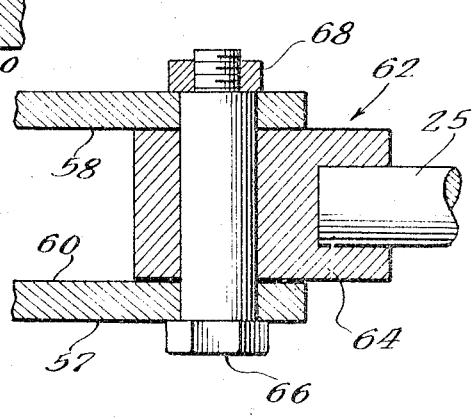
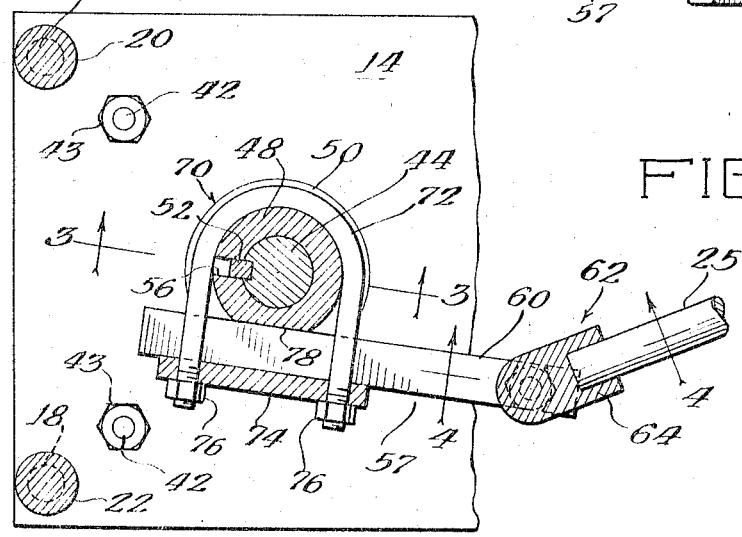

3,296,877
LEVER ARM FOR VALVE OPERATOR
Francis S. Flick, Oak Park, Roy Wilkes, Melrose Park, and Rollin J. Frantz, Elmhurst, Ill., assignors to Flick-Reedy Corporation, a corporation of Illinois
Continuation of application Ser. No. 263,292, Mar. 6, 1963. This application Apr. 12, 1965, Ser. No. 447,481
3 Claims. (Cl. 74—102)

This application relates to a power unit valve operator, and more particularly to a lever arm component for a valve operator. This application is a continuation of our pending application, Serial No. 263,292, filed March 6, 1963.

This application is an improvement of the device disclosed in the patent to Flick, 2,954,754, entitled "Valve Operator Unit," conceived by one of the joint inventors of this invention and owned by the assignee of this application. The power unit disclosed in the aforementioned patent is intended for use with butterfly valves or other valves requiring a similar motion for opening and closing of the valve. Valves of this type generally comprise a disc member interposed in a liquid conduit and positioned substantially transverse to the path of fluid flow when in a closed position. The disc is pivotally mounted in the conduit about an axis substantially transverse to the conduit fluid flow. By turning the disc about its axis, fluid flow through the conduit is regulated. The valve operator unit, of which this device is an improvement, includes a power unit secured in a frame which may be manufactured in standard sizes to fit different classes of valves. The power unit is operably associated with the valve shaft by means of an integral crank unit. The crank unit includes a hub portion which fits concentrically over the valve shaft and a crank arm which is secured to the power unit.

In valves of the type which are pivotally mounted in a conduit the valve shafts thereof may have different diameters thus necessitating hubs of different internal diameters. Moreover, crank arms of different lengths may be necessary, depending upon the force which is to be imparted to the shaft from the piston. Since the hub and arms of the crank means are an integral unit, these dimensional requirements of two components thereof present problems in stocking crank units for meeting the aforementioned size requirements.

It is therefore a primary object of this invention to provide a new and improved lever arm for a valve operator.

It is another object of this invention to provide a lever arm for a valve operator having interchangeable arm and hub portions.

It is still another object of this invention to provide a lever arm for a valve operator comprising a hub portion and an arm portion and a means for operably securing the hub and arm portion for operation in unison, wherein the securing means allows interchangeability of hub portions and arm portions, permitting interchangeability of the aforementioned components to adapt the lever arm for use with power units requiring hub portions or arm portions of different sizes.

Other objects, features and advantages of the present invention will be apparent from the following description of the preferred embodiment illustrated in the accompanying drawings, in which:

FIGURE 1 is a top plan view of a valve operator embodying this invention;

FIGURE 2 is a partially broken vertical section view of the valve operator of FIGURE 1 taken along the line 2—2 thereof;

FIGURE 3 is an enlarged fragmentary, partially broken section view showing the hub portion of the lever arm of this invention concentrically mounted on the valve shaft;

FIGURE 4 is an enlarged fragmentary section view of the connection of the arm portion of this invention with the piston rod and the power unit; and FIGURE 5 is an enlarged fragmentary section view taken along the line 5—5 of FIGURE 2 showing the lever arm of this invention in greater detail.

Referring now to the drawings, the operator 10 of this invention includes a frame 12 having a top plate 14 and a bottom plate 16. The posts 18 have threaded ends thereon and extend through openings in both plates substantially transverse thereto. Concentrically positioned on the posts 18 between the plates are spacing collars 20. Secured at the threaded ends of the posts 18 are nuts 22 which combine with the plates, spacing collars, and posts to form a substantilly rigid frame.

The power source for the device is provided by a piston and cylinder device 24 having a movable piston rod 25 extending outwardly therefrom. It is desirable that the piston and cylinder device be of the double-acting type with fluid connections 26 and connections 28 provided therein. A stub shaft, such as 30 extends from the piston and cylinder device 24 and is journaled in a bushing, such as 34, in the plate of the frame, thus providing a pivotal mounting for the piston and cylinder device for swinging movement in a plane parallel to the plates.

The frame 12 is secured to the valve shaft housing 38 by means of bolts 42 and nuts 43 threaded thereon which join the base plate 40 of the valve shaft housing to the bottom plate 16 of the frame 12. A portion of the valve shaft 44 extends vertically through the bottom plate 16 of the frame 12. This means of securing the frame 12 to the valve shaft housing facilitates easy installation and removal of the operator unit.

The improvement of this invention comprises the crank means or lever arms means 46 for turning the valve shaft 44 in response to actuation of the piston rod 25. The crank means 46 of this invention includes a hub 48 which is concentrically mounted on the valve shaft and pivotally secured at one end in a bushing 50 in the bottom plate 16. A key 52 is positioned in cooperating slots or keyways 54 and 56 in the shaft and hub, respectively, for operatively connecting the hub 48 to the shaft 44, so that rotational movement imparted to the hub will turn in the shaft as well. A plug 53 may be inserted in the upper end of the hub to keep out foreign matter. Moreover, this plug may be journaled in a bushing 55 in the upper plate to pivotally secure the crank means thereto.

The crank means of this invention further includes the arm portion 57 which includes a pair of parallel spaced elongate rigid bars or arms 58 and 60. The arms 58 and 60 are secured to the piston rod 25 by means of a clevis or connector 62. The connector 62 includes a block portion 64 which is generally secured to the rod by threading against a shoulder of the piston rod 25. The block is provided with a shouldered bolt 66 extending generally perpendicular to the plane of travel of the piston rod 25 and adapted to pivotally secure the arms 58 and 60 to the connector 62 in a plane substantially parallel to the plane of travel of the piston rod 25. A nut 68 secured to the threaded end of the threaded bolt 66 secures the arms to the connector as a unit relative to movement perpendicular to the plane of travel of the piston rod 25.

The crank means of this invention further includes a clamp means or means 70 for interchangeably or detachably connecting the arms 58 and 60 to the hub 48. Included in the means 70 is a U-bolt 72 and a plate 74 having openings therein through which the free threaded ends of the bolt 72 extend. Nuts 76 are secured to the threaded ends of the bolt 72 so that the plate and bolt form a unit serving as the interchangeable connector means 70.

The hub 48 has a longitudinally extending gripping surface or flat 78. The arms 58 and 60 extend from the connector 62 toward the hub 48 with a portion of the sides of arms positioned adjacent a flat 78 on the hub. The free ends of the U-bolt 72 extend between the arms 58 and 60 and are attached to the plate 74 which is positioned against the side of the arms opposite from that side positioned adjacent the hub 48. As the nuts 76 are tightened, the plate 74 cooperates with the flat 78 to lock the arms 58 and 60 as a unit preventing independent movement of one arm relative to the other in a plane parallel to that of the plane of travel of the piston rod. The arms are sufficiently locked to the hub portion so that they form a lever arm unit or crank means for turning the valve shaft 44 as the piston rod 25 moves laterally.

As shown in FIGURE 5, the hub 48 may be split longitudinally so that the key 52 may be inserted in the shaft slot 54 from the exterior thereof. As the nuts tighten the plate on the U-bolt, and force the arms against the hub, this will constrict the periphery of the hub to securely lock the key therein.

In the preferred embodiment of this invention, the hub portions are made of a constant outer diameter and different inner diameters to accommodate different shaft diameters. By providing the hubs with constant outer diameters, only one size of U-bolt 72 and plate 74 need be kept in stock for replacement of these items. Thus hubs 48 are easily manufactured, being basically circular cylindrical tubes with a keyway formed therein. The arms 58 and 60 each are made of flat bar stock and have a hole formed near one end thereof in which the connector bolt is positioned. These arms are made of different lengths to satisfy requirements for valve operators requiring different arm lengths. Thus, the arm portions are relatively inexpensive to produce. Since the arm portions and hub portions are interchangeable, the device of this invention reduces the number of parts that must be stocked to service valve operators of this type.

With the aid of this invention, greater flexibility and economy of lever arm parts for valve operator use is provided. This invention provides a twofold economy; economy due to interchangeability and economy due to the construction of the parts. The arm portions are bar stock merely requiring holes to be drilled in one end, the hub portion is a generally circular cylindrical tube requiring a keyway slot to be milled therein, and the single size U-bolt and plate assembly is relatively inexpensive to produce. Due to the interchangeability of the arm and hub portions, if it is necessary that a new hub portion be provided to accommodate a new valve shaft of different diameter, the remaining arm component may be used. Conversely, if a longer arm portion is necessary, the existing hub portion can still be utilized.

The foregoing detailed description has been given for clearness of understanding only, and no unnecessary limitations should be understood therefrom, for some modifications will be obvious to those skilled in the art.

We claim:

1. A crank unit for imparting linear movement from the piston of a piston and cylinder device as rotary movement to a shaft, comprising: a rigid frame including a pair of plates held apart by spacer means, one of said plates mounted about said shaft and having a bearing surface about said mounting, the other plate having an opening with a bearing surface therein formed opposite the first opening; a sleeve keyed to said shaft and pivoted in the bearing in said one plate; a pin keyed to said sleeve and pivoted in the opening in said other plate; a pair of substantially parallel elongate flat bars having means for detachably pivotally securing adjacent ends thereof to said piston rod for pivoting in a plane parallel to the plane of travel of said rod, the other ends of said bars positioned against said sleeve; and clamp means for detachably securing said arms in predetermined relation to said sleeve including a plate having a flat surface against the edges of the bars opposite the edges against the sleeve and a U-bolt positioned around said sleeve with the free threaded ends thereof extending between said arms and through said plate and the rounded U-portion of the bolt adjacent the sleeve, to form a unit having a predetermined lever arm length for translating the linear movement of said rod to rotary movement of said shaft while transmitting the linear forces to the plates of said unit.

2. A crank unit for imparting linear movement from the piston rod of a piston and cylinder device as rotary movement to a shaft, comprising: a rigid frame including a pair of plates held apart by spacer means, one of said plates mounted about said shaft and having a bearing surface about said mounting, the other plate having an opening with a bearing surface therein formed on an axis coincidental with the axis of the first opening; a sleeve keyed to said shaft and pivoted in the bearing in said one plate, said sleeve having a flat surface on a portion of the periphery thereof; a pin keyed to said sleeve and pivoted in the opening in said other plate; a pair of substantially parallel arms of flat bar stock, each of said arms having a pair of opposed flat faces and a pair of parallel opposed flat edges; means detachably pivotally securing one end of said arms to said piston rod so that the sides thereof overlie each other and a portion of the edges thereof are positioned adjacent to said flat portion of said sleeve; and clamp means for detachably securing said arms against said sleeve flat surface including a flat plate having a surface adjacent the edges of said bars opposite from the edges against the sleeve for maintaining continuous contact between the flat portion of the sleeve and the flat edges of the bars adjacent thereto, said clamp means further including means for preserving contiguous contact to form a unit for translating linear movement of said piston to rotary movement of said shaft.

3. The crank unit of claim 2 wherein said means for preserving contiguous contact of said clamp means includes a U-bolt positioned around the sleeve with the U portion of the bolt adjacent the sleeve and the free threaded ends thereof extending between said arms and through said plate with nut means threaded on said bolt for clamping the arms to the sleeve.

References Cited by the Examiner

UNITED STATES PATENTS

| | | | |
|---|---|---|---|
| 184,888 | 11/1876 | Munzinger | 85—1 |
| 1,792,729 | 2/1931 | Carter | 287—52.02 |
| 1,911,459 | 5/1933 | Mitchell | 287—52.02 |
| 1,950,383 | 3/1934 | Blattner | 287—52.02 |
| 2,444,922 | 7/1948 | Deetman | 287—52.05 |
| 2,458,740 | 1/1949 | Schafer | 287—52.05 X |
| 2,475,042 | 6/1949 | McCloskey | 287—53 |
| 2,954,754 | 10/1960 | Flick | 74—99 |

FOREIGN PATENTS

| | | |
|---|---|---|
| 1,009,577 | 3/1952 | France. |
| 114,993 | 9/1945 | Sweden. |

FRED C. MATTERN, JR., *Primary Examiner.*

F. E. BAKER, *Assistant Examiner.*